United States Patent
Zhang et al.

(10) Patent No.: US 12,403,540 B2
(45) Date of Patent: Sep. 2, 2025

(54) WELDING BEAD MODELING METHOD FOR WIRE-ARC ADDITIVE MANUFACTURING, DEVICE THEREFOR AND SYSTEM THEREFOR

(71) Applicant: HUAZHONG UNIVERSITY OF SCIENCE AND TECHNOLOGY, Hubei (CN)

(72) Inventors: Hai'ou Zhang, Hubei (CN); Guilan Wang, Hubei (CN); Shangyong Tang, Hubei (CN); Siyu Zhou, Hubei (CN); Runsheng Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 1039 days.

(21) Appl. No.: 17/310,905

(22) PCT Filed: Dec. 23, 2020

(86) PCT No.: PCT/CN2020/138656
§ 371 (c)(1),
(2) Date: Aug. 30, 2021

(87) PCT Pub. No.: WO2021/129671
PCT Pub. Date: Jul. 1, 2021

(65) Prior Publication Data
US 2022/0161344 A1  May 26, 2022

(30) Foreign Application Priority Data
Dec. 24, 2019 (CN) .................. 201911347776.X (51) Int. Cl.
B23K 9/00  (2006.01)
B23K 9/04  (2006.01)
(Continued)

(52) U.S. Cl.
CPC .............. *B23K 9/04* (2013.01); *B23K 9/0953* (2013.01); *B33Y 30/00* (2014.12)

(58) Field of Classification Search
None
See application file for complete search history.

(56) References Cited

U.S. PATENT DOCUMENTS

| 2009/0200282 A1* | 8/2009 | Hampton | B23K 9/0953 |
| | | | 219/130.33 |
| 2017/0028499 A1* | 2/2017 | Yoshida | B25J 9/163 |
| 2017/0032281 A1* | 2/2017 | Hsu | G06Q 10/06 |

FOREIGN PATENT DOCUMENTS

| CN | 103551709 A | 2/2014 |
| CN | 105478976 A | 4/2016 |

(Continued)

OTHER PUBLICATIONS

International Search Report of PCT/CN2020/138656 dated Mar. 23, 2021.

*Primary Examiner* — Paul B Yanchus, III
(74) *Attorney, Agent, or Firm* — Mark T. Vogelbacker; Eckert Seamans Cherin & Mellott, LLC (57) ABSTRACT

A welding bead modeling method for wire-arc additive manufacturing, a device therefor and a system therefor including using a dynamic parameter method, and using different welding process parameters in the same welding bead in the a wire-arc additive manufacturing process to obtain a welding bead with synchronous and dynamic changes in profile along with the dynamic changes of the welding process parameters. The method further comprising using a line laser sensor for scanning to obtain the segmented profile of the processed welding bead, and corresponding each welding bead profile to the welding process parameters one by one to train the neural network as training data, so as to obtain a welding bead modeling model capable (Continued)

of obtaining the corresponding welding bead profile according to the input welding process parameters.

20 Claims, 4 Drawing Sheets

(51) Int. Cl.
*B23K 9/095* (2006.01)
*B33Y 30/00* (2015.01)

(56) References Cited

FOREIGN PATENT DOCUMENTS

| | | |
|---|---|---|
| CN | 107649804 A | 2/2018 |
| CN | 108500498 A | 9/2018 |
| CN | 109158729 A | 1/2019 |
| CN | 110472698 A | 11/2019 |
| CN | 110883403 A | 3/2020 |
| JP | 2018192524 A | 12/2018 |

\* cited by examiner

WELDING BEAD MODELING METHOD FOR WIRE-ARC ADDITIVE MANUFACTURING, DEVICE THEREFOR AND SYSTEM THEREFOR

CROSS REFERENCE TO RELATED APPLICATION(S)

This patent application is a National Phase of International Application No. CN/US2020/138656, filed Dec. 23, 2020, which claims the benefit and priority of Chinese Patent Application filed in China National Intellectual Property Administration on Dec. 24, 2019 having the Application NO. 201911347776.X and entitled as "WELDING BEAD MODELING METHOD FOR WIRE-ARC ADDITIVE MANUFACTURING, DEVICE THEREFOR AND SYSTEM THEREFOR", the disclosures of which are incorporated by reference herein in their entirety as part of the present application.

TECHNICAL FIELD

The present disclosure relates to the technical field of wire-arc additive manufacturing, in particular to a welding bead modeling method for wire-arc additive manufacturing, a device therefor and a system therefor.

BACKGROUND ART

Wire-Arc Additive Manufacture (WAAM) uses the arc generated by welding machines such as metal inert-gas welding (MIG), Tungsten inert-gas welding (TIG) and plasma welding power supply (PA) as the heat source. Through the addition of metal wires, under the control of program, layers are stacked on the substrate according to the set forming path until the metal parts are nearly net formed. At present, the orthogonal experiment method and the response surface method are mainly used to build the conventional welding bead model of wire-arc additive manufacturing.

The orthogonal experiment method is to study the changing relationship between input parameters and output parameters by designing orthogonal experiments. This modeling method has many experiments, and it is easy to have wrong parameters when the experimental method is improper. In order to obtain the optimal parameters, it usually needs many experiments to reduce the parameter range to achieve the optimal parameters. This experimental method usually cannot obtain the mathematical relationship between input parameters and output parameters, and can only study the optimal trend of parameters.

Another widely used method is a response surface method. By building the relationship model between input parameters and output parameters, the relationship expression between input and output is obtained by regression equation. Although this modeling method is more scientific and reliable than the orthogonal experiment method, the number of experiments increases. At the same time, because of its few parameters, the instability or error of the experiment easily leads to larger parameter errors.

SUMMARY

Based on this, the purpose of the present disclosure is to provide a welding bead modeling method for wire-arc additive manufacturing, a device therefor and a system therefor, in which a deep learning model is used to express the relationship between the forming process parameters and the welding bead shape, and a dynamic parameter method is used in the off-line training process, so that different welding process parameters are used in the same welding bead to obtain multiple sets of experimental data through one processing experiment, avoiding the need to design a set of experiments for each set of experimental parameters. Sufficient training data are provided for neural network training modeling under the condition of reducing the number of experiments and experimental cost, and the technical problem that the traditional orthogonal experiment method and the corresponding curved surface method need complex regression equation selection and parameter optimization is solved at the same time.

In order to achieve the above purpose, the present disclosure provides a welding bead modeling method for wire-arc additive manufacturing, which comprises an off-line training stage and an on-line modeling stage;

the off-line training stage comprises the steps of:

step 1: dynamic processing and data acquisition using a dynamic parameter method, and using different welding process parameters in the same welding bead in the a wire-arc additive manufacturing process to obtain a welding bead with synchronous and dynamic changes in profile along with the dynamic changes of the welding process parameters; wherein the welding process parameters comprise welding bead temperature, welding current, welding voltage, wire feeding speed and travelling speed; in the welding process, acquiring the temperature of the welding bead in real time by an infrared thermal imager;

using a line laser sensor for scanning to obtain the segmented profile of the welding bead obtained by the dynamic parameter method, and corresponding each welding bead profile to the welding process parameters one by one as training data; wherein the welding bead profile comprises a welding bead height and a welding bead width;

step 2: model training using welding process parameters as the input of neural network, using the welding bead profile corresponding to the input welding process parameters as the output of neural network, and training the neural network, so as to obtain a welding bead modeling model capable of obtaining the corresponding welding bead profile according to the input welding process parameters;

the online modeling stage comprises the steps of:

step 3, acquiring welding process parameters in real time in the wire-arc additive manufacturing process, and inputting the acquired welding process parameters into the welding bead modeling model obtained by off-line training in step 2 to obtain the welding bead profile.

Preferably, in step 1, the welding process parameters and the welding bead profile of the arc starting head and the arc extinguishing tail of the weld are ignored, and only the welding process parameters and the welding bead profile of a welding bead between the arc starting head and the arc extinguishing tail are acquired as valid data for model training in step 2.

Preferably, in step 1, the welding process parameters are dynamically changed from the arc starting point to the arc ending point in sections within the range of a welding bead between the arc starting head and the arc extinguishing tail, so as to obtain a large amount of valid training data through a welding test.

Preferably, in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

The present disclosure further provides a computer-readable storage medium, wherein a computer program is stored on the computer-readable storage medium, and the computer program, when executed by a processor, implements the welding bead modeling method for wire-arc additive manufacturing described above.

The present disclosure further provides a welding bead modeling device for wire-arc additive manufacturing, comprising the computer-readable storage medium described above and a processor for calling and processing a computer program stored in the computer-readable storage medium.

The present disclosure further provides a welding bead modeling system for wire-arc additive manufacturing, comprising an infrared thermal imager, a Hall sensor, a numerical control machine tool, a welding machine, a current sensor, a welding machine control board, a line laser scanner and the device described above;

wherein the infrared thermal imager is configured to acquire the temperature of the welding bead, the Hall sensor is configured to acquire the welding voltage, the numerical control machine tool is configured to control the travelling speed of the welding machine, the current sensor is configured to acquire the welding current, the welding machine control board is configured to control the wire feeding speed of the welding machine, and the line laser scanner is configured to scan the welding bead to obtain the welding bead profile.

According to the specific embodiment provided by the present disclosure, the present disclosure discloses the following technical effects.

(1) In the present disclosure, the complex regression equation selection and parameter optimization of the traditional orthogonal experiment method and the corresponding curved surface method can be avoided by using the neural network to establish the welding bead modeling model between the input parameters and the output parameters of the welding bead. At the same time, the neural network can continuously train and optimize the current model in the later continuous experiment and actual modeling operation, thus obtaining a better deep learning network.

(2) Because the traditional neural network training needs a large amount of sample data, and a large number of wire-arc additive manufacturing experiments are costly both in time and material, the present disclosure innovatively puts forward a dynamic parameter experiment method to design the experimental process of welding bead data acquisition. The processing parameters dynamically change in sections. A large amount of data of input parameters and output parameters of the welding bead profile can be obtained only through several sets of parameter experiments, thus avoiding the need to design a set of experiments for each set of experimental parameters, reducing the number of experiments and the experimental cost, and greatly shortening the time and threshold of establishing a welding bead model.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

DETAILED DESCRIPTION OF THE EMBODIMENTS

The technical scheme in the embodiments of the present disclosure will be described clearly and completely hereinafter with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The purpose of the present disclosure is to provide a welding bead modeling method for wire-arc additive manufacturing, a device therefor and a system therefor, in which a deep learning model is used to express the relationship between the forming process parameters and the welding bead shape, and a dynamic parameter method is used in the off-line training process, so that different welding process parameters are used in the same welding bead to obtain multiple sets of experimental data through one processing experiment, avoiding the need to design a set of experiments for each set of experimental parameters. Sufficient training data are provided for neural network training modeling under the condition of reducing the number of experiments and experimental cost, and the technical problem that the traditional orthogonal experiment method and the corresponding curved surface method need complex regression equation selection and parameter optimization is solved at the same time.

In order to make the above objects, features and advantages of the present disclosure more obvious and understandable, the present disclosure will be further explained in detail hereinafter with reference to the drawings and specific embodiments.

The present disclosure provides a new method for modeling a welding bead profile, wherein the modeling adopts a deep learning model based on a neural network, and the deep learning model is a valid tool for establishing complex relationships without making any assumptions between multiple inputs and outputs, especially for nonlinear systems. In the present disclosure, the deep learning model is used to represent the relationship between the forming process parameters and the welding bead shape. According to the present disclosure, a dynamic parameter method is used in the experimental design, and a numerical control machine tool and a welding machine are utilized, so that different welding process parameters are used in the same welding bead, avoiding the need to design a set of experiments for each set of experimental parameters, reducing experiment times and experiment costs, and providing sufficient training data for neural network modeling.

Figure 1:
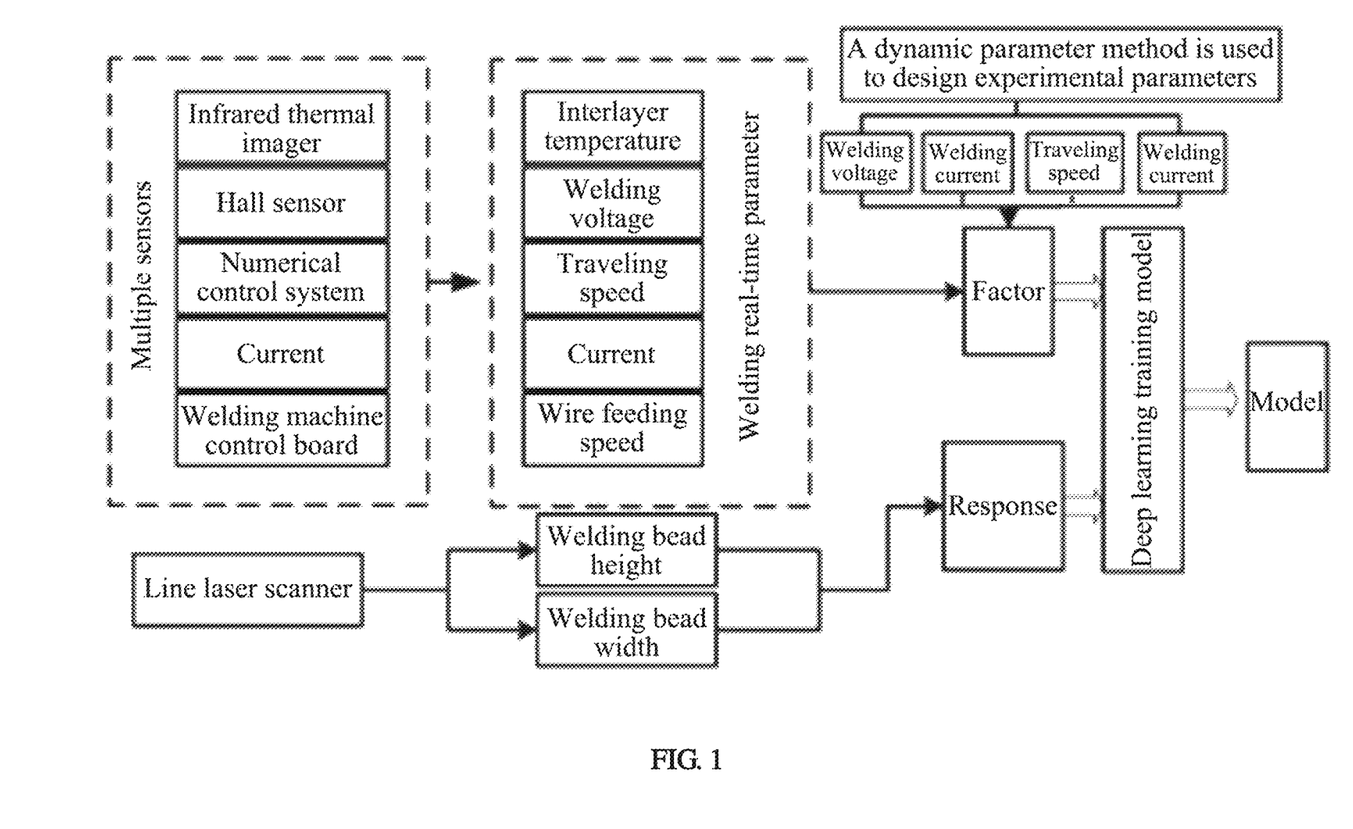
FIG. 1 is a schematic diagram of the overall flow and the system framework according to an embodiment of the present disclosure.

As shown in FIG. 1, the preferred experimental system and modeling system of the present disclosure comprise an infrared thermal imager, a Hall sensor, a numerical control machine tool, a welding machine, a current sensor, a welding machine control board, and a line laser scanner. The infrared thermal imager is configured to acquire the temperature of the welding bead, the Hall sensor is configured to acquire the welding voltage, the numerical control machine tool is configured to control the travelling speed of the welding machine, the current sensor is configured to acquire the welding current, the welding machine control board is configured to control the wire feeding speed of the welding machine, and the line laser scanner is configured to scan the welding bead to obtain the welding bead profile.

The training and modeling of the weld profile model can be realized based on computer calling a convolution neural network program, which specifically comprises an off-line training stage and an on-line modeling stage The off-line training stage comprises the steps of:

step 1: dynamic processing and data acquisition using a dynamic parameter method, and using different welding process parameters in the same welding bead in the a wire-arc additive manufacturing process to obtain a welding bead with synchronous and dynamic changes in profile along with the dynamic changes of the welding process parameters; wherein the welding process parameters comprise welding bead temperature, welding current, welding voltage, wire feeding speed and travelling speed; in the welding process, acquiring the temperature of the welding bead in real time by an infrared thermal imager;

using a line laser sensor for scanning to obtain the segmented profile of the welding bead obtained by the dynamic parameter method, and corresponding each welding bead profile to the welding process parameters one by one as training data; wherein the welding bead profile comprises a welding bead height and a welding bead width;

step 2: model training using welding process parameters as the input of neural network, using the welding bead profile corresponding to the input welding process parameters as the output of neural network, and training the neural network, so as to obtain a welding bead modeling model capable of obtaining the corresponding welding bead profile according to the input welding process parameters;

the online modeling stage comprises the steps of:

step 3, acquiring welding process parameters in real time in the wire-arc additive manufacturing process, and inputting the acquired welding process parameters into the welding bead modeling model obtained by off-line training in step 2 to obtain the welding bead profile.

Preferably, in step 1, the welding process parameters and the welding bead profile of the arc starting head and the arc extinguishing tail of the weld are ignored, and only the welding process parameters and the welding bead profile of a welding bead between the arc starting head and the arc extinguishing tail are acquired as valid data for model training in step 2.

Preferably, in step 1, the welding process parameters are dynamically changed from the arc starting point to the arc ending point in sections within the range of a welding bead between the arc starting head and the arc extinguishing tail, so as to obtain a large amount of valid training data through a welding test. The dynamic change in sections is to segment the welding bead, and different welding process parameters are set in each welding bead section.

Preferably, in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

The modeling method of the present disclosure is described in detail with a more specific case.

Figure 2:
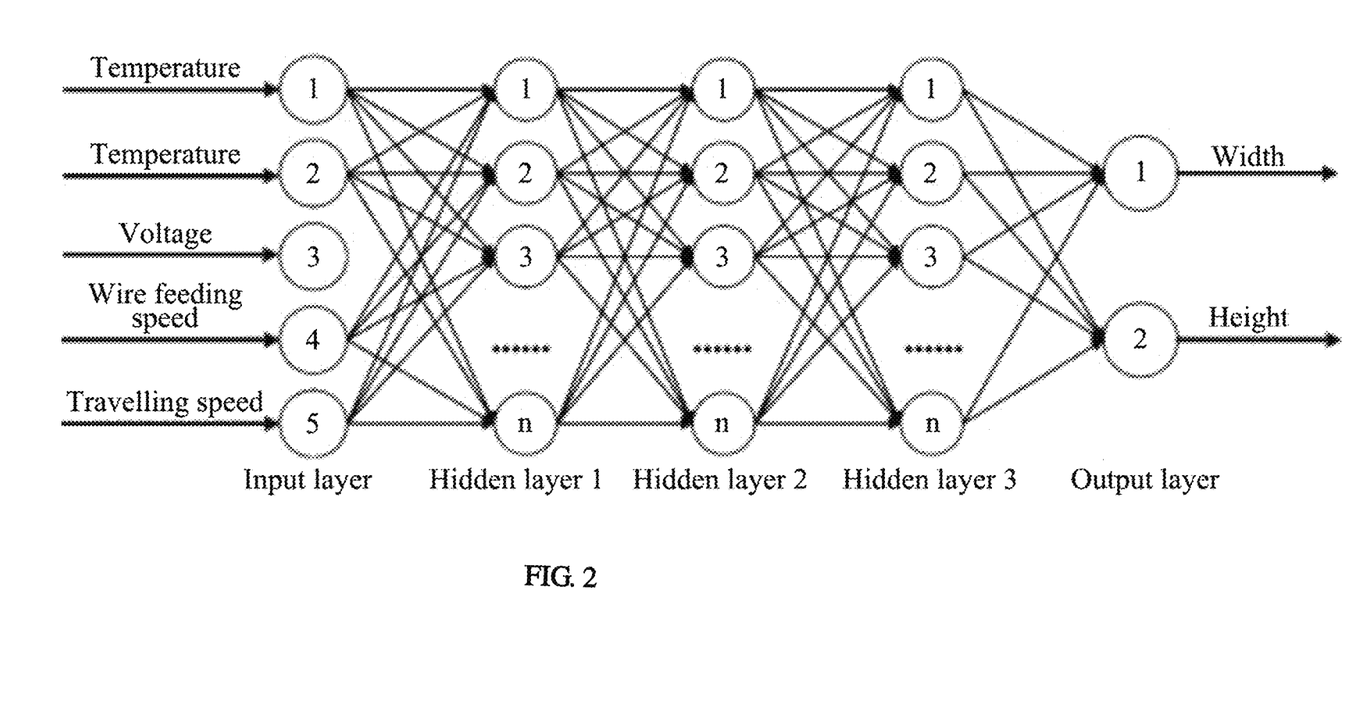
FIG. 2 is a structural diagram of a convolutional neural network model used in an embodiment of the present disclosure.

As shown in FIG. 2, the modeling method in the present disclosure uses a deep learning model, and the deep learning model is used to express the relationship between the forming process parameters and the welding bead shape. The deep learning model is preferably a convolutional neural network, which consists of an input layer, three hidden layers and an output layer. Neurons are completely connected between layers, and nonlinear mapping is performed between input parameters and response parameters. The forming process parameters are temperature, current, voltage, wire feeding speed and travelling speed, and the width and height of the welding bead are used to describe the shape of the welding bead. Then it is necessary to select training data for the deep learning model.

Figure 3:
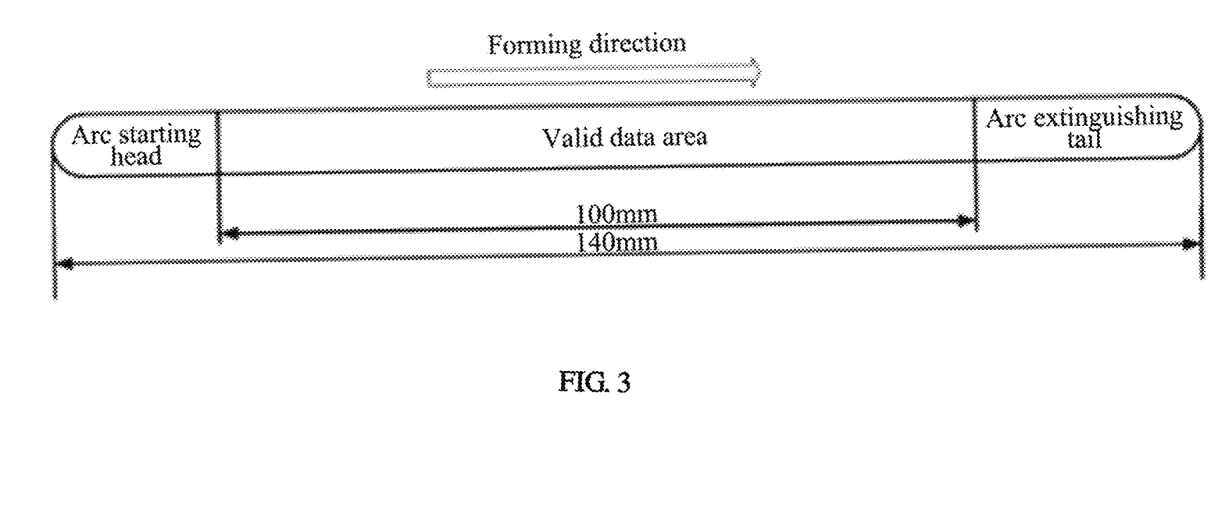
FIG. 3 is a schematic diagram of a welding direction and a welding valid data area according to an embodiment of the present disclosure.

In the deposition process of the WAAM, the weld geometry of the arc starting point and the arc ending point is usually unstable. In order to avoid abnormal areas at both ends of the weld, this embodiment adds an interval of 20 mm between both ends on the weld. Only the middle area of the weld (100 mm) is valid for data acquisition, as shown in FIG. 3. In this embodiment, the length of the whole path is 140 mm, and only 100 mm is used to ensure the reliability of the acquired data.

By using the dynamic parameter experiment (DPE) method proposed by the present disclosure, the forming parameters of the WAAM are dynamically changed from the arc starting point to the arc ending point in sections making full use of the length of 100 mm. The change of the forming parameters will lead to the change of the width and height of the weld. After that, the geometric shape information of the formed welding bead is measured by using a line laser sensor, so that the input data (welding parameters) and response data (welding bead profile) can be matched one by one. In this way, a large number of training data of the deep learning model can be obtained.

In this embodiment, in order to ensure the welding stability, the welding voltage is modified in such a manner that the welding machine automatically adjusts parameters according to the welding current, and the same temperature is passively changed in the welding process. Therefore, only the three parameters of travelling speed (S, mm/min), wire feeding speed (F, m/min) and welding current (C, A) are dynamically and actively changed, as shown in FIG. 4.

The operation flow of the system and the experimental method described above is as follows.

Step 1: communication is established between a numerical control machine tool and a welding machine to ensure that process parameters of the welding machine can be changed through numerical control codes, and the traveling speed of the welding machine can be easily obtained directly according to the numerical control codes.

Figure 4:
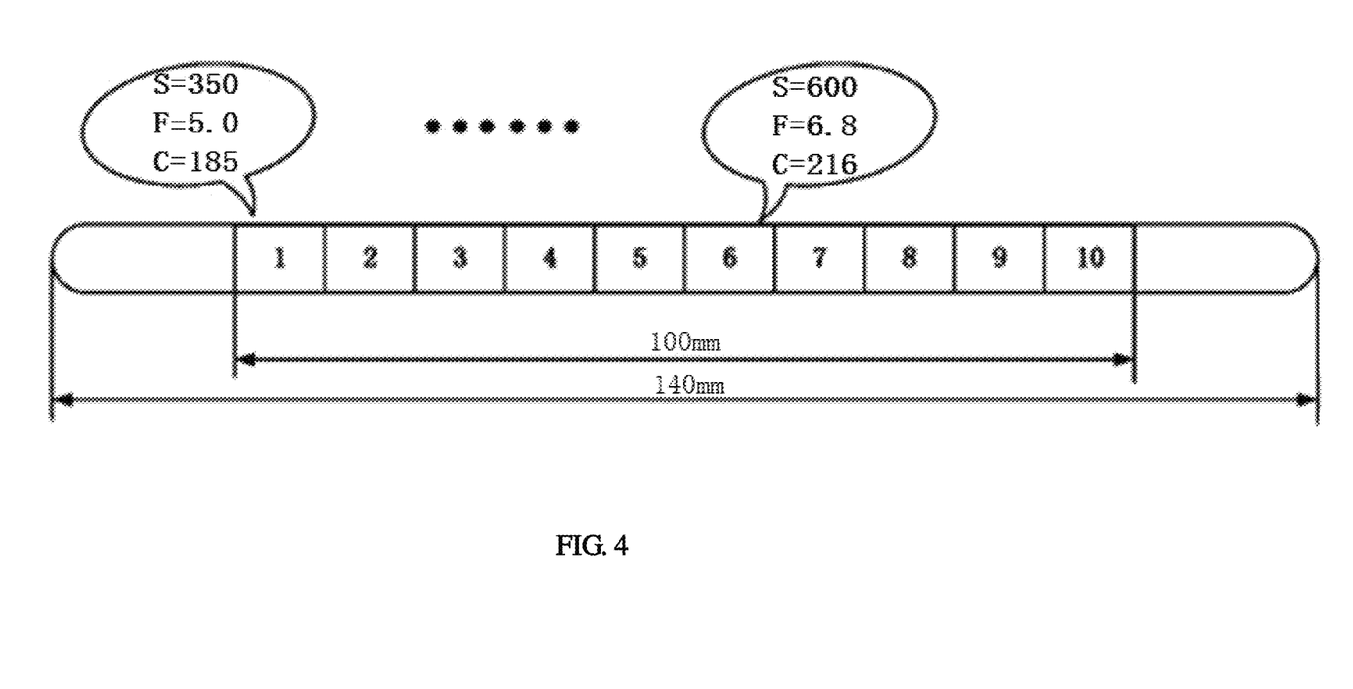
FIG. 4 is an experimental design idea diagram of a dynamic parameter method according to the embodiment of the present disclosure.

Step 2: according to FIG. 4, the experiment is designed by using the dynamic parameter method, and the welding process parameters are constantly changed in the process of walking forward in the same welding bead, and are written into numerical control codes.

Step 3: the variable parameter numerical control codes in step 2 are used to carry out the experiment. During the experiment, a Hall voltage sensor, a Hall current sensor and a welding machine control board are used to acquire voltage, current and wire feeding speed, and the infrared thermal imager is used to acquire welding bead temperature, and then feed the data back to the computer through a high-speed acquisition card. In this process, only the data in the valid data area in FIG. 3 are acquired.

Step 4: after each welding bead experiment is completed, the line laser sensor in the figure is used to scan the profile of the finished welding bead and extract the welding bead width and the welding bead height of each part. Then, according to FIG. 1, the height and width of each welding bead in each section correspond to the process parameters of the corresponding section one by one to form training data.

Step 5: the convolution neural network in FIG. 2 is trained using training data to obtain a welding seam modeling model.

Step 6: for the actual processing process, welding parameters are acquired according to Step 3 and are input into the welding seam modeling model trained in Step 5, and the welding seam is modeled.

In the present disclosure, a specific example is applied to illustrate the principle and implementation of the present disclosure, and the explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:

1. A welding bead modeling method for wire-arc additive manufacturing, wherein the method comprises an off-line training stage and an on-line modeling stage;
   the off-line training stage comprises the steps of:
   step 1:
   using a dynamic parameter method, and using different welding process parameters in the same welding bead in the wire-arc additive manufacturing process to obtain a welding bead with synchronous and dynamic changes in profile along with the dynamic changes of the welding process parameters; wherein the welding process parameters comprise welding bead temperature, welding current, welding voltage, wire feeding speed and travelling speed; in the welding process, acquiring the temperature of the welding bead in real time by an infrared thermal imager;
   using a line laser sensor for scanning to obtain the segmented profile of the welding bead obtained by the dynamic parameter method, and corresponding each welding bead profile to the welding process parameters one by one as training data; wherein the welding bead profile comprises a welding bead height and a welding bead width;
   step 2: conducting model training
   using welding process parameters as the input of neural network, using the welding bead profile corresponding to the input welding process parameters as the output of neural network, and training the neural network, so as to obtain a welding bead modeling model capable of obtaining the corresponding welding bead profile according to the input welding process parameters;
   the on-line modeling stage comprises the steps of:
   step 3, acquiring welding process parameters in real time in the wire-arc additive manufacturing process, and inputting the acquired welding process parameters into the welding bead modeling model obtained by off-line training in step 2 to obtain the welding bead profile.

2. The welding bead modeling method for wire-arc additive manufacturing according to claim 1, wherein in step 1, the welding process parameters and the welding bead profile of the arc starting head and the arc extinguishing tail of the weld are ignored, and only the welding process parameters and the welding bead profile of a welding bead between the arc starting head and the arc extinguishing tail are acquired as valid data for model training in step 2.

3. The welding bead modeling method for wire-arc additive manufacturing according to claim 2, wherein in step 1, the welding process parameters are dynamically changed from the arc starting point to the arc ending point in sections within the range of a welding bead between the arc starting head and the arc extinguishing tail, so as to obtain a large amount of valid training data through a welding test.

4. The welding bead modeling method for wire-arc additive manufacturing according to claim 1, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

5. A computer-readable storage medium, wherein a computer program is stored on the computer-readable storage medium, and the computer program, when executed by a processor, implements the method according to claim 1.

6. A welding bead modeling device for wire-arc additive manufacturing, comprising the computer-readable storage medium according to claim 5 and a processor for calling and processing a computer program stored in the computer-readable storage medium.

7. A welding bead modeling system for wire-arc additive manufacturing, comprising an infrared thermal imager, a Hall sensor, a numerical control machine tool, a welding machine, a current sensor, a welding machine control board, a line laser scanner and the device according to claim 6;
   wherein the infrared thermal imager is configured to acquire the temperature of the welding bead, the Hall sensor is configured to acquire the welding voltage, the numerical control machine tool is configured to control the travelling speed of the welding machine, the current sensor is configured to acquire the welding current, the welding machine control board is configured to control the wire feeding speed of the welding machine, and the line laser scanner is configured to scan the welding bead to obtain the welding bead profile.

8. The welding bead modeling method for wire-arc additive manufacturing according to claim 2, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

9. The welding bead modeling method for wire-arc additive manufacturing according to claim 3, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

10. The computer-readable storage medium according to claim 5, wherein in step 1, the welding process parameters and the welding bead profile of the arc starting head and the arc extinguishing tail of the weld are ignored, and only the welding process parameters and the welding bead profile of a welding bead between the arc starting head and the arc extinguishing tail are acquired as valid data for model training in step 2.

11. The computer-readable storage medium according to claim 10, wherein in step 1, the welding process parameters are dynamically changed from the arc starting point to the arc ending point in sections within the range of a welding bead between the arc starting head and the arc extinguishing tail, so as to obtain a large amount of valid training data through a welding test.

12. The computer-readable storage medium according to claim 5, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

13. The computer-readable storage medium according to claim 10, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

14. The computer-readable storage medium according to claim 11, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

15. The welding bead modeling device for wire-arc additive manufacturing according to claim 6, wherein in step 1, the welding process parameters and the welding bead profile of the arc starting head and the arc extinguishing tail of the weld are ignored, and only the welding process parameters and the welding bead profile of a welding bead between the arc starting head and the arc extinguishing tail are acquired as valid data for model training in step 2.

16. The welding bead modeling device for wire-arc additive manufacturing according to claim 15, wherein in step 1, the welding process parameters are dynamically changed from the arc starting point to the arc ending point in sections within the range of a welding bead between the arc starting head and the arc extinguishing tail, so as to obtain a large amount of valid training data through a welding test.

17. The welding bead modeling device for wire-arc additive manufacturing according to claim 6, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

18. The welding bead modeling device for wire-arc additive manufacturing according to claim 15, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

19. The welding bead modeling device for wire-arc additive manufacturing according to claim 16, wherein in step 1, the welding voltage is automatically adjusted by a welding machine according to the welding current, and the temperature is passively changed with the change of the welding current in the welding process; the three parameters of travelling speed, wire feeding speed and welding current are dynamically and actively changed in a preset way.

20. The welding bead modeling system for wire-arc additive manufacturing according to claim 7,
wherein in step 1, the welding process parameters and the welding bead profile of the arc starting head and the arc extinguishing tail of the weld are ignored, and only the welding process parameters and the welding bead profile of a welding bead between the arc starting head and the arc extinguishing tail are acquired as valid data for model training in step 2.

\* \* \* \* \*